United States Patent

[11] 3,596,898

[72] Inventor Luell Hilburn
7240 Manila Ave., El Cerrito, Calif. 94530
[21] Appl. No. 805,279
[22] Filed Mar. 7, 1969
[45] Patented Aug. 3, 1971

[54] FIXTURE FOR WELDING PIPES
6 Claims, 3 Drawing Figs.
[52] U.S. Cl. .................................................. 269/243, 269/249
[51] Int. Cl. ...................................................... B23k 37/04
[50] Field of Search............................................ 269/243, 244, 287, 249; 81/174

[56] References Cited
UNITED STATES PATENTS
234,091  11/1880  Thompson.................... 81/174
1,325,380  12/1919  Seitzman...................... 81/174
2,308,340  1/1943  Newlon........................ 269/287

Primary Examiner—Andrew R. Juhasz
Assistant Examiner—Donald D. Evenson
Attorney—Owen, Wickersham and Erickson ABSTRACT: A fixture for retaining the ends of two pipe sections together during welding. The fixture comprises an upper clamp and a lower clamp, the lower clamp having an extension going out to one side and rigidly secured to an upstanding threaded rod. The upper clamp has an extension going out to one side and terminating in a sleeve which is slidable up and down on the threaded rod but is not threaded to it. A wing nut or nut with a handle is threaded on the rod above the sleeve of the upper clamp and is used to tighten that clamp into place to hold the pipe ends firmly between the two clamp members. Central portions of the clamps are recessed to give greater availability to the welding fixture before the pipe has to be turned, so that only one turn is usually required to weld the entire peripheries of the two pipes.

Patented Aug. 3, 1971
3,596,898
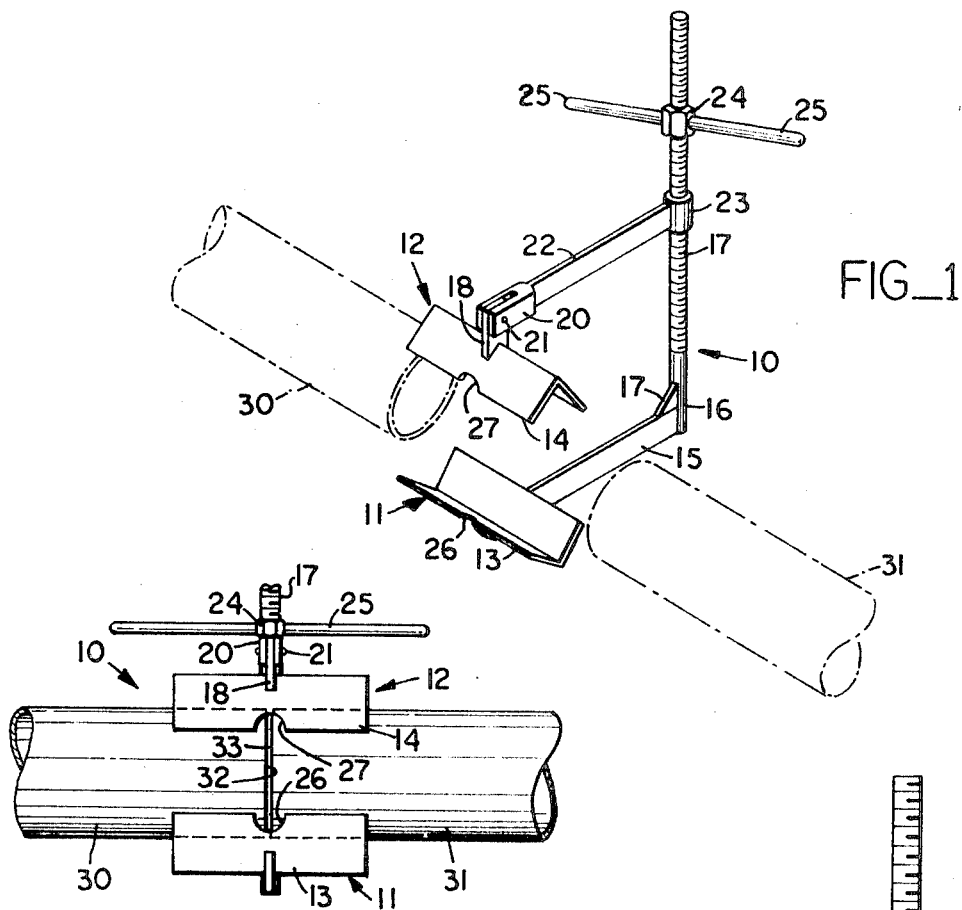
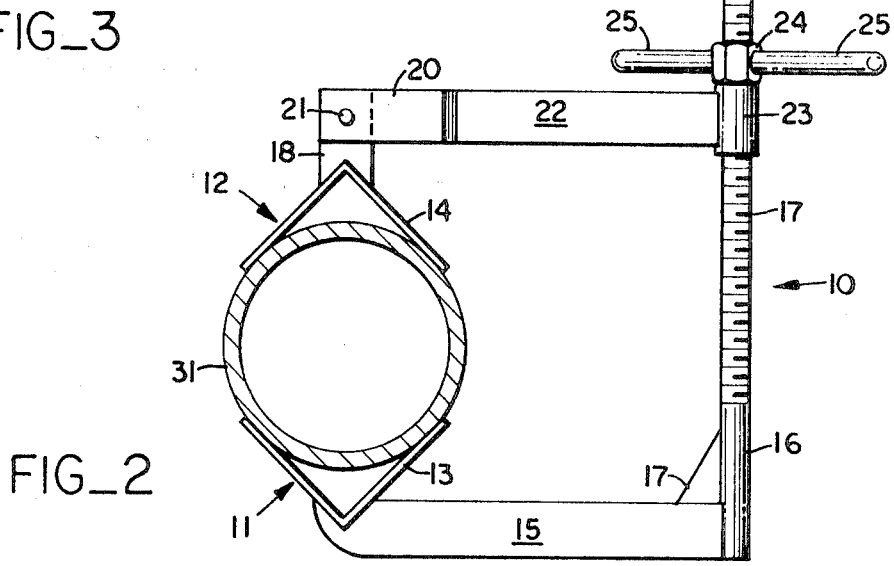
INVENTOR.
LUELL HILBURN
BY
Owen, Wickersham & Erickson
ATTORNEYS

FIXTURE FOR WELDING PIPES

This invention relates to a fixture for holding the ends of two pipes together when they are to be welded.

Oftentimes pipe must be welded in the field, and heretofore it has been difficult to maintain the alignment of the two pieces. They have often been too heavy to be held manually, and even when light enough it takes two persons, gives difficulty in steadiness, and one cannot hold them too close to the point where the weld is taking place. Vises often have had to be improvised on the spot and relatively inconvenient arrangements arrived at. Also, when some equipment, such as vises, has been available, it has been difficult or even impossible to adjust between widely varying sizes of pipe.

With this invention it takes only a matter of seconds to get the pipe ends properly aligned, and they are held aligned during welding. With this equipment, the operation can be done by one man but if he has some assistance, it can be done even quicker. Also, the device is adaptable to pipe over widely varying diameters. For example, one size of fixture can be used for pipes ranging from 4 inches to 18 inches in diameter.

Briefly summarized, the invention comprises the use of two clamps, an upper clamp and a lower clamp, both having extensions leading out to the side. The extension on the lower clamp member is secured to the lower end of a threaded rod and the extension from the upper clamp member terminates in a sleeve which is slidable freely up, down, and around the threaded rod. A clamping nut with a handle on it is used to tighten against the sleeve and to force the clamps together.

Other objects and advantages of the invention will appear from the following description of a preferred embodiment thereof.

In the drawings:

FIG. 1 is a view in perspective of a fixture embodying the principles of the invention. Two pipes are shown in broken lines about to be placed into the fixture.

FIG. 2 is a view in side elevation of the fixture with the pipe held in place. The pipe is shown in section.

FIG. 3 is a fragmentary view in front elevation of the device with the top portion of the threaded rod omitted and with the pipes cut off on each side of the fixture. The pipe is shown preparatory to the weld being made, with the two ends abutted against each other.

The fixture 10 of this invention comprises a lower clamp member 11 and an upper clamp member 12 which are brought together to hold the pipe firmly.

The lower clamp member 11 may comprise an angle iron 13 of desired size and the upper clamp member 12 may comprise an angle iron 14 of the same size. The lower angle iron 13 is rigidly secured, preferably by welding, to an extension member 15 which may comprise a flat vertical bar extending out to the side, preferably perpendicular to the plane which would bisect the angle of the angle iron 13. At its distal end, the bar 15 is secured, preferably by welding, to a vertical rod 16 with a long threaded portion 17, preferably comprising most of the length of the rod 16. To give added strength, the members 15 and 16 may be braced by an angular member or gusset 17, which is welded to both of the members 15 and 16.

The upper clamp member 12 has a short bracket 18, preferably of flat bar stock, extending up generally vertically from it and generally perpendicular to the angle iron 14 and to the plane bisecting the angle thereof. The bracket 18 is preferably held pivotally between the two branches of a clevis 20 by a pin 21, on which the member 18 may be free to pivot somewhat, although in some circumstances it may be rigid. Pivoting has advantages in installing and removing pipe from the fixture. The clevis 20 is located at the extremity of a bar 22 which extends parallel to the bar 15 and which terminates in a sleeve 23. The sleeve 23 is not interiorly threaded and loosely surrounds the rod 16, so that it can slide up and down freely.

The clamping action of the upper clamp assembly 12 and lower clamp assembly 11 is obtained with the aid of a clamping member such as a nut 24 having handles 25. The nut 24 is threaded onto the portion 17 of the rod 16 and hence exerts considerable force. It is located above the sleeve 23, and when moved down against it, acts to move the angle iron 14 toward the angle iron 13, thereby to tighten the clamping action of the irons 13 and 14 about anything that is located in between them. One angle iron is adaptable to a wide variety of sizes of pipes, since it does not have to be long enough to lie tangent to them, though it may do so for certain sizes of pipes. As long as the pipe is clamped firmly, the angle iron is doing its job.

To give the welder more room in which to work in between the angle irons 13 and 14, both of these angles irons are preferably recessed at the center on both sides by slots or recesses 26 and 27. This means that a welding torch can impinge its flame on the pipes over a considerable arc.

In operation, let us suppose that two pipes 30 and 31 are to be joined with their ends 32 and 33 welded together. These ends 32 and 33, if slightly out of line, will of course not give a good weld and also the pipes will diverge. Thus, it is quite important that the pipes be properly aligned, and this is done by using the clamp 10 of this invention. To start with, the clamp 10 is opened widely and the upper clamp assembly 12 may be lifted and swung out of the way. Then the pipes 30 and 31 are set onto the lower clamp assembly 11, resting on top of the angle iron 13 and in the angle. The two pipes 30 and 31 are both put in and therefore an approximate alignment is already obtained. Then, depending on the terrain available, it may be desirable to have some one lift the outer ends of the pipes as this operation continues, although that may not be necessary. At any rate, the upper clamping assembly 12 is then moved into position vertically above the lower clamping assembly 11 and resting on it. Then the handles 25 are used to bring the nut 24 down against the sleeve 23, to force clamp assembly 12 to engage the pipes 30 and 31 very snugly and tightly and to hold the ends 32 and 33 in proper alignment, either abutted or at least close enough together to enable the welding operation. During the welding operation the welding torch has access to a considerable arc of the pipe ends 32, 33, and even when the size of the pipes 30, 31 is small relative to the size of the angle irons 13 and 14, as in the illustrations in the drawings, the recesses 26 and 27 enable the torch to get at a large proportion of the periphery, so that the pipes 30 and 31 need only be turned once during the welding operation. When doing such turning, the handles 25 are turned to raise the nut 24 slightly, the pipes 30 and 31 are rotated, and then the handles 25 are turned to clamp the nut 24 down on the sleeve 23 again, to tighten the members 13 and 14 firmly on opposite sides of the pipes 30 and 31. When the weld has been completed, the pipe assembly may be removed, by giving the handles 25 a few turns and lifting the upper assembly 12, preferably by grasping the bar 22 and pulling up, so that the sleeve 23 and the angle iron 14 move up at the same time, and the angle iron 14 may be swung on the pivot 21 to help release the pipes, or the entire assembly can be swung to one side, so that the pipe can be lifted off without any obstruction above it.

To those skilled in the art to which this invention relates, many changes in construction nd widely differing embodiments and applications of the invention will suggest themselves without departing from the spirit and scope of the invention. The disclosures and the description herein are purely illustrative and are not intended to be in any sense limiting.

I claim:

1. A fixture for holding the ends of two pipes together during a butt welding operation, including in combination:

a lower clamp assembly having a clamp member and an arm extending horizontally therefrom, an upper clamping assembly having a clamp member and an arm extending horizontally therefrom and terminating in a sleeve, both said clamp members being of substantial length for engagement on upper and lower surfaces of both said pipes for a substantial distance on both sides of the place where they abut, said clamp members engaging and supporting said pipes, a threaded rod having a lower end secured rigidly to the arm of said lower clamp assembly and extending upwardly therefrom, said sleeve being slidable relative to said rod, and a nut having a handle thereon and engaging the rod threadably above said sleeve and to bear against said sleeve to cause the upper clamping member to move toward the lower clamping member and to clamp a pipe firmly.

2. The fixture of claim 1 wherein central portions of the outer edges of the clamps are recessed to give a greater weld distance in between clamps.

3. The fixture of claim 1 wherein said upper assembly provides a pivotal connection between its clamp and its arm.

4. A fixture for holding the ends of two pipes together while butt-welding the two ends together, including in combination:

a lower clamp member comprising a first angle iron, an arm extending perpendicularly to it out to the side from the outer face thereof, an upper clamping member comprising a second angle iron, both said first and second angle irons having a substantial length, long enough to bridge across the two pipes where the pipes abut and to engage both pipes for a substantial distance from their abutment, a short member extending perpendicularly and vertically upward from the outside surface of said second angle iron, a bar extending perpendicularly to said short member and laterally, generally parallel to the said arm and terminating in a sleeve, a threaded rod having a lower end secured to said arm and extending upwardly therefrom, said sleeve being slidable relative to said rod, and a nut having a handle thereon and adapted to engage the rod threadably on the opposite side of the sleeve from said arm and to bear against said sleeve to cause the upper clamping member to move toward the lower clamping member and to clamp a pipe firmly.

5. The fixture of claim 4 wherein central portions of the outer edges of both said angle irons are recessed to give a greater weld distance along the ends of pipes clamped between said clamping members.

6. The fixture of claim 4 wherein said short vertical member and said bar are pivotally connected together for free movement in a plane of said second angle iron.